United States Patent [19]
Yip

[11] 4,253,382
[45] Mar. 3, 1981

[54] STEERING VALVE ASSEMBLY FOR STEERING AND BRAKE SYSTEM

[75] Inventor: James K. Yip, Richfield, Minn.

[73] Assignee: Eaton Corporation, Cleveland, Ohio

[21] Appl. No.: 73,164

[22] Filed: Sep. 7, 1979

[51] Int. Cl.³ .............................................. F15B 11/16
[52] U.S. Cl. ...................................... 91/516; 91/517; 91/518
[58] Field of Search ................. 91/514, 516, 517, 518, 91/532, 388; 60/422

[56] References Cited
U.S. PATENT DOCUMENTS

| Re. 25,126 | 2/1962 | Charlson | 91/467 |
|---|---|---|---|
| 3,455,210 | 7/1969 | Allen | 91/446 |
| 3,834,163 | 9/1974 | Wilke | 91/28 |
| 4,034,563 | 7/1977 | Orth | 91/516 |
| 4,061,201 | 12/1977 | Dunn | 60/422 |
| 4,074,528 | 2/1978 | Lourigan | 60/422 |
| 4,075,840 | 2/1978 | Jesswein | 60/422 |

*Primary Examiner*—Abraham Hershkovitz
*Attorney, Agent, or Firm*—R. J. McCloskey; J. Yakimow; L. Kasper

[57] ABSTRACT

A vehicle hydraulic system is disclosed of the type including a steering control valve (29), a brake system (31), and an auxiliary load circuit (65). Fluid flow to these load circuits is controlled by a flow control valve assembly (11) including a priority spool valve (85) which controls the flow of fluid from the inlet port (13) to the priority fluid chamber (75). Fluid flows from the priority fluid chamber to the steering control valve and the brake load system, in parallel, and at equal levels of priority. A shuttle valve assembly (83) receives a steering load signal by means of a load signal line (44) and a brake load signal from the load signal chamber (111), and transmits the higher of the two load signals into the load signal chamber (93) which biases the priority spool valve toward a position to permit a greater flow of fluid into the priority fluid chamber. Therefore, the control valve assembly disclosed herein requires only a single pump to provide sufficient fluid to satisfy the simultaneous demand for fluid by both the steering system and brake system.

8 Claims, 5 Drawing Figures

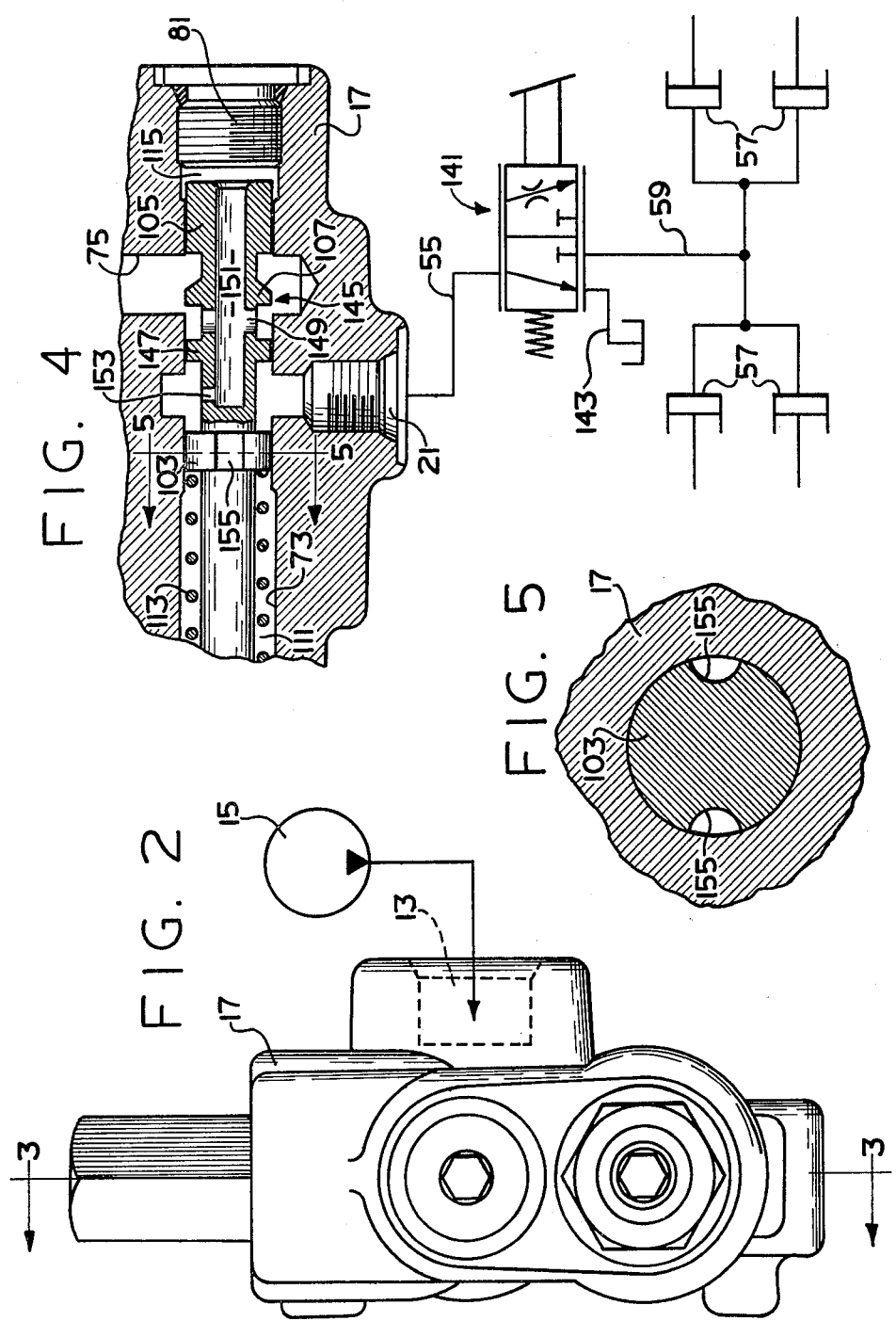

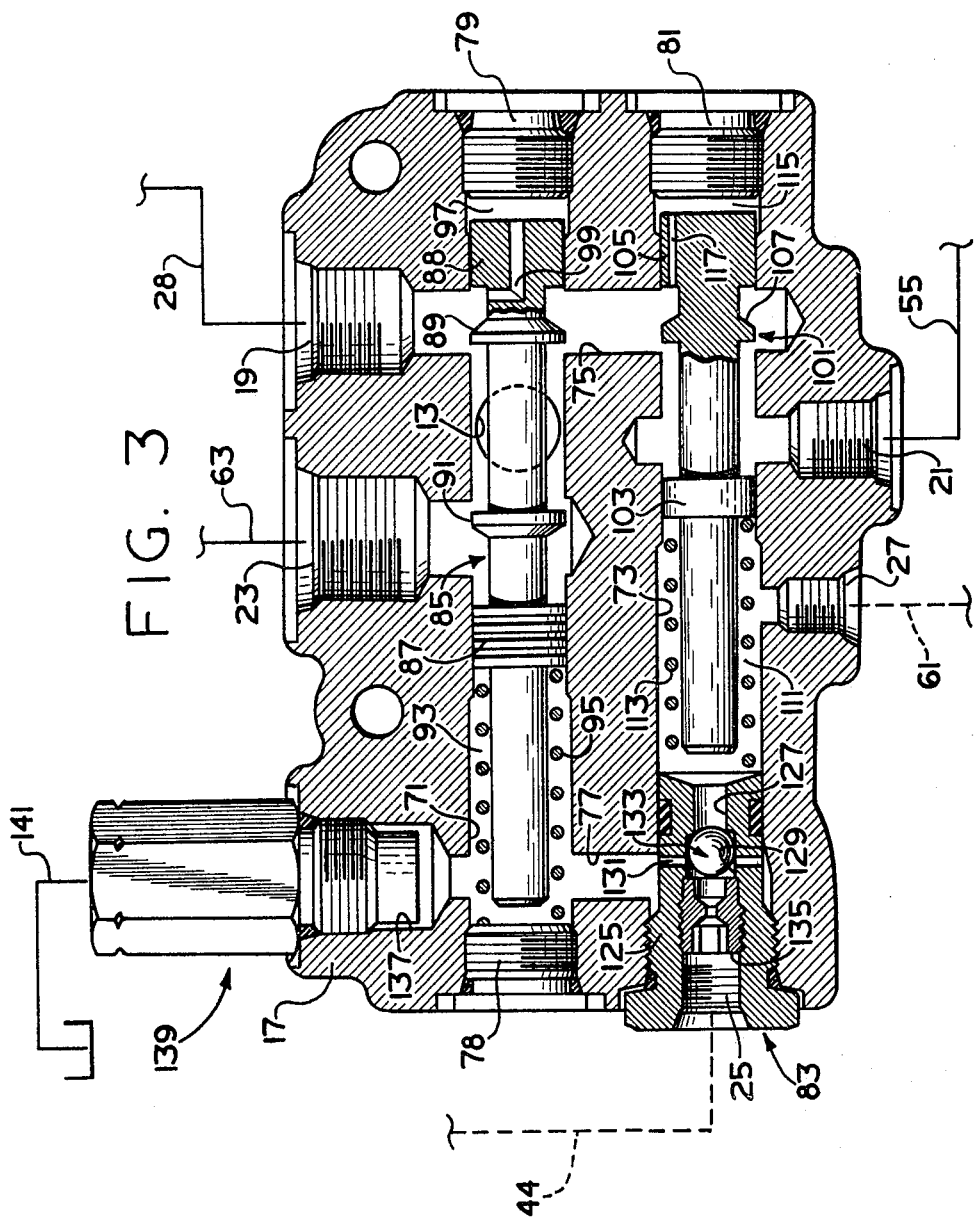

STEERING VALVE ASSEMBLY FOR STEERING AND BRAKE SYSTEM

BACKGROUND OF THE DISCLOSURE

The present invention relates generally to vehicle hydraulic systems, and more particularly, to such systems including two or more hydraulic actuators which, under certain conditions, must be given priority over other vehicle hydraulic functions.

Although the present invention may be used to control the flow of fluid to many different types of fluid actuated systems and components, it is especially useful in a vehicle hydraulic system including some sort of hydrostatic steering control system and a hydraulic power brake system, and will be described in connection therewith.

Off-highway vehicles, such as agricultural tractors and construction equipment, using both hydrostatic steering systems and hydraulic brake systems have been known for many years. For safety reasons, there are times when the hydrostatic steering system needs priority over all other vehicle hydraulic functions. On the other hand, there are times when, also for safety reasons, the hydraulic brake system must have priority over all other hydraulic functions on the vehicle.

One of the common approaches to the situation wherein either the steering system or brake system may require priority has been to provide two pumps to supply the system. Normally, in such an arrangement, one of the pumps feeds the steering system while the other pump feeds the brake system, and excess fluid from the pumps, not required by either steering or brakes, may be utilized by one or more auxiliary load circuits. It has been recognized that a system including two pumps will inherently result in a greater waste of pump input horsepower, especially when neither the steering nor the brake system is being utilized.

Partly in response to the need to conserve pump input horsepower on such vehicles, the trend in mobile hydraulics has been toward greater use of "load sensing" hydraulic components, i.e., those which sense the load or pressure on the associated fluid actuated device and transmit a load signal to the variable source of fluid which, in response to the load signal, adjusts its fluid output to satisfy the demand for fluid. The trend toward the use of load sensing on vehicle hydraulic components has probably been greatest in the case of hydrostatic steering systems.

SUMMARY OF THE INVENTION

Accordingly, it is an object of the present invention to provide an improved vehicle hydraulic system of the type including at least two components which may require priority over the other vehicle hydraulic functions wherein only a single pump is required to provide fluid for the entire system, and the priority load circuits are given substantially equal priority, at least one of the priority load circuits being of the load sensing type.

The above and other objects of the present invention are accomplished by the provision of an improved flow control valve assembly for use in a system including a source of pressurized fluid, a first priority load circuit having means providing a first load signal, a second priority load circuit, and an auxiliary load circuit. The flow control valve assembly comprises valve housing means defining first and second valve bores and a priority fluid chamber, each of the valve bores being in communication with the fluid chamber. The valve housing means further defines an inlet port for connection to the source of fluid, a first priority outlet port for connection to the first priority load circuit, a second priority outlet port for connection to the second priority load circuit, and an auxiliary outlet port for connection to the auxiliary load circuit. The inlet fluid port and the auxiliary outlet port are in open fluid communication with the first valve bore, the first priority outlet port being in communication with the priority fluid chamber and the second priority outlet port being in communication with the second valve bore. A first valve member is movably disposed in the first valve bore and there are means biasing the first valve member toward a position permitting substantially all fluid to flow from the inlet fluid port to the priority fluid chamber, and means communicating a first pressure signal representative of the fluid pressure in the priority fluid chamber to exert a force biasing the first valve member toward a position permitting substantially all fluid to flow from the inlet port to the auxiliary port. A second valve member is movably disposed in the second valve bore and there are means defining a throttling orifice operable to throttle the fluid pressure of fluid flowing from the priority fluid chamber to the second priority outlet port to provide either a generally constant pressure differential across a variable flow control orifice in the second priority load circuit, or a generally constant rate of fluid flow through the throttling orifice. There are means biasing the second valve member toward a position tending to increase the rate of fluid flow, the biasing means including a second load signal representative of the load on the second priority load circuit. Also included are means communicating a second pressure signal to exert a force biasing the valve member toward a position to decrease the rate of fluid flow, the pressure of the second pressure signal being representative of the pressure upstream of the variable flow control orifice. The valve housing defines a load signal port for connection to the first load signal and to the second load signal and included is a shuttle valve for communicating the higher of the load signals to exert a force biasing the first valve member toward the position permitting substantially all fluid to flow from the inlet to the priority fluid chamber. This arrangement provides a flow into the priority fluid chamber which is sufficient to satisfy the simultaneous demand for fluid of the first and second priority load circuits.

BRIEF DESCRIPTION OF THE DRAWINGS

FIG. 2 is an end view of the control valve of the present invention, and on a larger scale than the schematic representation of FIG. 1.

FIG. 3 is an axial cross section, taken on line 3—3 of FIG. 2, and on the same scale as FIG. 2.

FIG. 4 is a fragmentary, axial cross section, similar to FIG. 3, illustrating an alternative embodiment of the present invention.

FIG. 5 is a transverse cross section taken on line 5—5 of FIG. 4, and on a scale twice that of FIG. 4.

DESCRIPTION OF THE PREFERRED EMBODIMENTS

Figure 1:
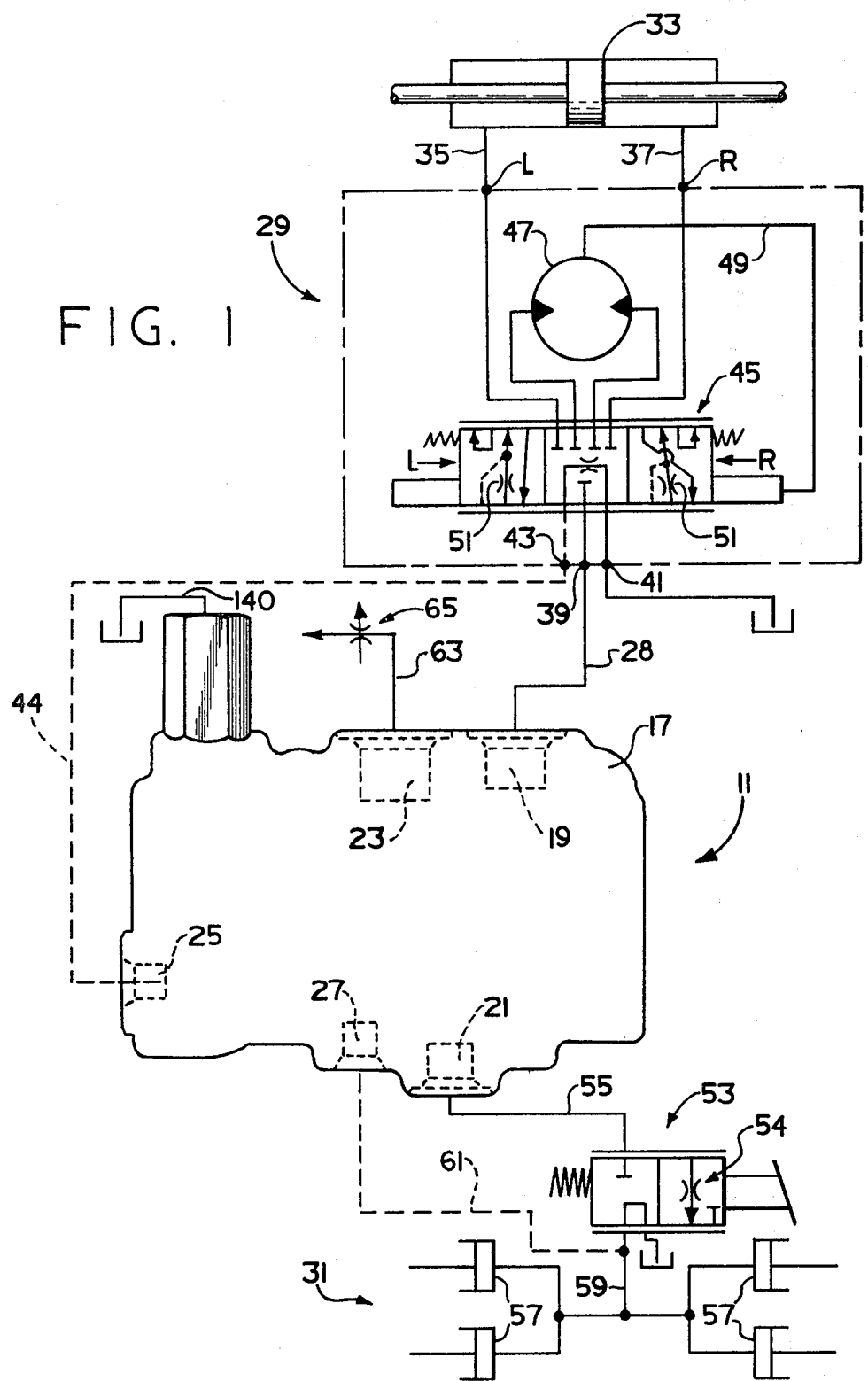
FIG. 1 is an illustration, partly in hydraulic schematic, of a system utilizing the control valve assembly of the present invention.

Referring now to the drawings, which are not intended to limit the present invention, FIG. 1 illustrates schematically a hydraulic system including a flow control valve assembly, generally designated 11. The valve assembly 11 receives pressurized fluid at an inlet port 13 (FIG. 2) from a fixed displacement pump 15 which provides hydraulic fluid at a constant flow and variable pressure. Although the pump is illustrated herein as being fixed displacement, it should become apparent to those skilled in the art that the pump could also be of the variable displacement (pressure compensated) type or of the load sensing (pressure and flow compensated) type, as will be discussed more fully hereinafter.

The flow control valve assembly 11 includes a valve housing 17 which, in addition to the inlet port 13, defines a pair of priority outlet ports 19 and 21, and an auxiliary outlet port 23, the ports 19, 21, and 23 being shown schematically in FIG. 1. The valve housing 17 further defines a pair of load signal ports 25 and 27, also shown schematically in FIG. 1.

Connected to the priority outlet port 19 by means of a conduit 28 is a steering control valve, generally designated 29, and connected to the priority outlet port 21 is a brake system, generally designated 31.

The steering control valve 29, may be of a type well known in the art, such as is illustrated in U.S. Pat. No. Re.25,126, assigned to the assignee of the present invention and incorporated herein by reference. The steering control valve 29 includes a left fluid port L and a right fluid port R, which are connected to the opposite ends of a steering cylinder 33 by a pair of fluid conduits 35 and 37, respectively. The steering control valve 29 further includes a fluid inlet port 39, a fluid return port 41, and a load signal port 43, which is connected to the load signal port 25 by means of a signal line 44. Disposed within the steering control valve 29 is a valving arrangement, generally designated 45, which is movable from its neutral position shown in FIG. 1 to either a right turn position R or a left turn position L. When the valving arrangement 45 is in either of the turn positions, the pressurized fluid passing through the valving 45 flows through a fluid meter 47, the function of which is to measure the proper amount of fluid to be fed to the appropriate fluid port L or R. As is well known in the art, the fluid meter 47 is typically connected to the valving arrangement 45 by means of a mechanical follow-up, shown schematically at 49. In either of the turn positions, the valving arrangement 45 defines a variable orifice 51, the flow area of which is generally proportional to the deflection of the valving.

As is shown schematically in FIG. 1, and is now well known in the art, the steering control valve 29 is of the particular type referred to as "load sensing", such that a load signal is communicated from downstream of the variable orifice 51 to the load signal port 43. The steering control valve 29 is referred to as "load sensing" because the fluid pressure at the load signal port 43 represents the instantaneous steering load being exerted on the steering cylinder 33. It should be understood by those skilled in the art that the present invention is not limited to any particular configuration of steering control valve, and furthermore, it would be within the scope of the present invention for the load circuit connected to the priority outlet port 19 to comprise something other than a steering control system. However, it is an essential feature of the present invention that the load circuit connected to the priority outlet port 19 be of the type which provides a load signal representative of the demand for fluid pressure by the load circuit.

The brake system 31 includes a closed-center load sensing brake valve 53, defining a variable flow control orifice 54 and having its inlet connected to the priority outlet port 21 by means of a conduit 55. The outlet of the brake valve 53 is connected to a set of hydraulic brake actuators 57 by means of a conduit 59, and in fluid communication therewith is a load signal line 61 which transmits to the load signal port 27 a pressure (load) signal representative of the instantaneous load exerted on the brake actuators 57.

Connected to the auxiliary outlet port 23 by means of a conduit 63 is an auxiliary load circuit which, for purposes of simplicity is illustrated schematically herein by a variable orifice 65. It will be understood by those skilled in the art that because the pump 15 is fixed displacement, the auxiliary load circuit 65 should be an open-center load circuit. However, it should also be clear that the auxiliary load circuit could be of either the closed-center or load sensing variety, in which case the pump would be either variable displacement or load sensing, respectively, and the flexibility in the selection of the pump and auxiliary load circuit, without modification of the flow control valve 11, is one of the advantages of the present invention.

Referring now primarily to FIG. 3, the flow control valve assembly 11 will be described in detail. As is shown schematically in FIG. 1, the valve housing 17 defines the priority outlet ports 19 and 21, the auxiliary outlet port 23, and the load signal ports 25 and 27. The valve housing 17 further defines a pair of parallel, axially-extending valve bores 71 and 73 which are interconnected, toward the right end of the housing 17, by a fluid chamber 75, the function of which will be described subsequently. The valve bores 71 and 73 are also interconnected, toward the left end of the housing 17, by a passage 77, the function of which will also be described subsequently.

In open fluid communication with the valve bore 17 are the inlet port 13 and the auxiliary outlet port 23, and in open fluid communication with the valve bore 73 are the priority outlet port 21 and the load signal port 27. In open fluid communication with the fluid chamber 75 is the priority outlet port 19. A pair of plug members 78 and 79 are in threaded, sealing engagement with the left and right ends, respectively, of the valve bore 71, and a plug member 81 is in threaded, sealing engagement with the right end of the valve bore 73. In threaded, sealing engagement with the left end of the valve bore 73 is a shuttle valve assembly, generally designated 83, the structure and function of which will be described in greater detail subsequently.

Disposed within the valve bore 71 is a spool valve, generally designated 85, which includes a plurality of lands 87, 88, 89, and 91. The spool land 87 preferably comprises a plurality of narrow lands, and cooperates with the left end portion of the valve bore 71 to define a load signal chamber 93. Disposed within the chamber 93 and seated, at its opposite ends, against the plug member 78 and spool land 87 is a compression spring member 95. Both the fluid pressure in the load signal chamber 93, and the spring 95 are effective to bias the valve spool 85 toward the right in FIG. 3. The spool land 88 cooperates with the right end of the valve bore 71 and the plug member 79 to define a pressure signal chamber 97, into which is communicated a pressure signal from the fluid chamber 75 by means of a signal passage 99.

The spool land 89 cooperates with the adjacent portion of the valve bore 71 to meter the flow of fluid from the inlet port 13 into the fluid chamber 75, and similarly, the spool land 91 cooperates with the adjacent portion of valve bore 71 to meter the flow of fluid from the inlet port 13 into the auxiliary outlet port 23. Therefore, with fluid flowing through the inlet port into the valve bore 71 at a constant rate, an increase in fluid pressure in the load signal chamber 93 will result in a greater flow of fluid past the land 89 into the fluid chamber 75, whereas an increase in the fluid pressure in the signal chamber 97 will result in a greater flow of fluid past the land 91 into the auxiliary outlet port 23.

Disposed in the valve bore 73 is a valve spool, generally designated 101, having a plurality of lands 103, 105, and 107. The spool land 103 cooperates with the valve bore 73 and shuttle valve assembly 83 to define a load signal chamber 111. Disposed within the load signal chamber 111, and seated against the shuttle valve assembly 83 and land 103 is a compression spring 113, biasing the valve spool 101 to the right in FIG. 3. The spool land 105 cooperates with the right end portion of the valve bore 73, and the plug member 81 to define a pressure signal chamber 115 which receives a pressure signal through an axial passage 117, as will be described in greater detail subsequently.

The spool land 107 cooperates with the adjacent portion of the valve bore 73 to meter the flow of fluid from the fluid chamber 75 into the priority outlet port 21.

The shuttle valve assembly 83 includes an externally-threaded fitting member 125 which is in threaded engagement with the valve housing 17 and defines the load signal port 25. The fitting member 125 further defines a relatively smaller axial bore 127, communicating with the valve bore 73, a relatively larger axial bore 129, and a plurality of radial passages 131 providing fluid communication between the bore 129 and the passage 77. Disposed within the bore 129 is a shuttle ball 133, and in threaded engagement with the bore 129 is a member 135 defining a fluid orifice and a valve seat. As should be apparent to those skilled in the art, the function of the shuttle valve assembly 83 is to receive the steering load signal at the load signal port 25, and receive the brake load signal at the axial bore 127, and communicate the higher of the two load signals through the radial passages 131 and the passage 77 into the load signal chamber 93.

Also in fluid communication with the load signal chamber 93 is a threaded bore 137, into which is threaded a relief valve assembly, generally designated 139, which may be made in accordance with any of a number of well known relief valve designs. The function of the relief valve assembly 139 is to limit the fluid pressure in the load signal chamber 93, to prevent movement of the spool valve 85 to the extreme right in FIG. 3., when neither the steering control valve 29 nor the brake system 31 is actually demanding a quantity of fluid which would require such a position of the spool valve 85. The relief valve assembly 139 may be connected directly to the system reservoir by a conduit 141 (FIGS. 1 and 2).

Operation

Referring now primarily to FIGS. 1 and 3, the operation of the present invention will be described in connection with several different operating modes. In the first operating mode to be considered, it will be assumed that neither the steering control valve 29 nor the brake system 31 is being used, and that the only demand for fluid is by the auxiliary load circuit 65. Under these conditions, the fluid pressure in the load signal chamber 93 will be nearly zero, indicating no demand for fluid by either the steering control valve 29 or brake system 31. With no pressure in the load signal chamber 93, the standby fluid pressure in the fluid chamber 75 (e.g., about 50 to 100 psi) is sufficient to overcome the biasing force of the spring 95 and bias the spool valve 85 toward the left in FIG. 3 to a position in which substantially all fluid entering the inlet port 13 flows past the land 91 and out the auxiliary outlet port 23 to the auxiliary load circuit 65.

In the next mode of operation to be described, it will be assumed that the vehicle operator has begun to rotate the vehicle steering wheel to perform a steering maneuver. Rotation of the steering wheel results in displacement of the valving arrangement 45 from the neutral position shown in FIG. 1 to the appropriate one of the actuated positions. Initiation of a steering maneuver will result in a steering load signal being transmitted from downstream of the variable orifice 51 to the load signal port 43, and through the load signal line 44 to the load signal port 25 of the valve assembly 11. Because, in the operating condition being described, there is no load signal present in the load signal chamber 111, the shuttle ball 133 is moved to the right in the bore 129 by the fluid pressure present in the load signal port 25, and the steering load signal is transmitted through the radial passages 131 and the passage 77 into the load signal chamber 93. The increased pressure in the load signal chamber 93 causes the valve spool 85 to move to the right in FIG. 3, permitting fluid flow from the inlet port 13, past the spool land 89 into the fluid chamber 75, while reducing the fluid flow from the inlet port 13 to the auxiliary outlet port 23.

In the operating condition described above, the pressure in the chamber 75, which is transmitted through the axial passage 117 into the pressure signal chamber 115, is sufficient to overcome the biasing force of the spring 113 and bias the valve spool 101 to a position in which the spool land 107 substantially prevents fluid communication from the fluid chamber 75 into the priority outlet port 21. Thus, substantially all fluid entering the fluid chamber 75 flows out through the priority outlet port 19 to the steering control valve 29.

In the third operating mode to be described, it will be assumed that, during the steering mode described above, the vehicle operator actuates the brake system 31, i.e., moves the load-sensing brake valve 53 from the position shown in FIG. 1 to an actuated condition in which the conduits 55 and 59 are connected. The load or force exerted on the hydraulic brake actuators 57 is sensed in the load signal line 61 and is transmitted to the load signal port 27, and to the load signal chamber 111. The increased pressure in the load signal chamber 111 causes the valve spool 101 to move to the right in FIG. 3, such that an orifice is formed between the spool land 107 and the adjacent portion of the valve bore 73, and fluid begins to flow from the fluid chamber 75 to the priority outlet port 21.

At this point, there are two different possible sequences of events depending upon the relationship between the steering load signal present in the load signal port 25 and the brake load signal present in the load signal chamber 111:

(1) If the brake load signal is higher, the shuttle ball 133 shifts to the left in FIG. 3 and the brake load signal is transmitted through the bore 127, through the radial passages 131 and the passage 77 into the load signal chamber 93, thus biasing the spool valve 85 further to the right in FIG. 3, increasing the flow of fluid from the inlet port 13 into the fluid chamber 75. The increased quantity of fluid flowing into the fluid chamber 75 is sufficient to satisfy the demand for fluid by the brake system 31, as that demand is represented by the pressure differential between the pressure signal chamber 115 and the load signal chamber 111. It will be appreciated that, under these conditions, the fluid pressure at the inlet port 39 of the steering control valve 29 will be higher than would normally be required, in relation to the steering load exerted on the cylinder 33. However, the situation described above is not normally encountered when both the steering control valve 29 and the brake system 31 are being operated.

(2) If the steering load signal is higher, the shuttle ball 133 remains shifted to the right in FIG. 3, and the steering load signal is transmitted as described previously, such that the pressure in the load signal chamber 93 does not immediately change. However, the shifting of the valve spool 101 to a position permitting fluid flow from the fluid chamber 75 to the priority outlet port 21 (which is at a lower pressure than the priority outlet port 19), will result in an instantaneous decrease in the pressure in the fluid chamber 75. This decrease in pressure will result in a decrease in pressure in the pressure signal chamber 97, and movement of the valve spool 85 to the right in FIG. 3, again resulting in increased fluid flow from the inlet port 13 into the fluid chamber 75.

It should be noted that in either of the sequences described in paragraphs (1) and (2) above, the resulting position of the valve spool 85 will be the same, and the total flow of fluid into the fluid chamber 75 will be the same, assuming that the flows demanded by the steering control valve 29 and brake system 31 are the same in either sequence. Thus, it may be seen that the present invention provides a control valve assembly which is capable of giving priority to two different priority load circuits simultaneously, regardless of which of the load circuits is subjected to the greater load.

Referring now to FIGS. 4 and 5, there is illustrated an alternative embodiment of the present invention in which like elements bear like numerals, and new or modified elements bear numerals beginning with 141. In the embodiment of FIG. 4, the load sensing brake valve 53 of FIG. 1 has been replaced by an open center brake valve 141. The brake valve 141 has its inlet connected to the priority outlet port 21 by means of the conduit 55, and has its outlet connected to the set of hydraulic brake actuators 57 by means of the conduit 59. With the brake valve 141 in the unactuated position shown in FIG. 4, the conduit 55 is in fluid communication with the system reservoir through a conduit 143.

It is a feature of the present invention that the substitution of the open center brake system for the load sensing brake system may be accomplished without substantial modification of the flow control valve assembly 11. Because, in the FIG. 4 embodiment, there is no brake load signal line (such as load signal line 61 of FIGS. 1 and 3), there is no need in the FIG. 4 embodiment for the load signal port 27. In the FIG. 4 embodiment, the load signal port 27 is not shown, but as a practical matter, and for simplicity of manufacture, it would be preferable to merely plug the load signal port 27 whenever the valve assembly 11 is to be used with an open center brake circuit.

In the FIG. 4 embodiment, the valve spool 101 of the preferred embodiment is replaced by a valve spool, generally designated 145 which includes, in addition to the lands 103, 105, and 107, a fourth land 147. The spool land 147 is in sealing engagement with the valve bore 73 to separate the pressurized fluid in the priority fluid chamber 75 from the pressurized fluid flowing into the priority outlet port 21. The valve spool 145 defines a plurality of radial passages 149 which permit fluid to flow from the fluid chamber 75, past the land 107, into an axially-oriented passage 151 which is in communication, at its right end, with the pressure signal chamber 115. At the left end of the axial passage 151 is a flow control orifice 153 through which fluid flows from the passage 151 to the priority outlet port 21.

On the downstream side of the flow control orifice 153, pressurized fluid is in communication with the load signal chamber 111 by means of a pair of generally semicircular passages 155 (see FIG. 5) defined by the spool land 103. It will be appreciated by those skilled in the art that the communication of pressurized brake circuit fluid into the load signal chamber 111 could be accomplished in any one of a number of functionally equivalent ways, and the arrangement shown in FIGS. 4 and 5 is by way of example only.

It should also be understood by those skilled in the art that the operation of the FIG. 4 embodiment is generally the same as that described in connection with the preferred embodiment, except that, because the brake valve 141 is of the open center type, fluid flows from the chamber 75 out of the priority outlet port 21 to the brake valve 141 at a substantially constant flows rate (e.g., 2 gpm), but at a fluid pressure determined by the load imposed on the brake actuators 57. Therefore, in the FIG. 4 embodiment, the spool valve 145 is positioned in response to the pressures in the load signal chamber 111 and pressure signal chamber 115 to maintain a substantially constant pressure drop across the flow control orifice 153, for a constant flow therethrough, whereas in the preferred embodiment, the valve spool 101 is positioned in response to the pressures in the chambers 111 and 115 to maintain a substantially constant pressure drop across the variable flow control orifice 54 defined by the valve 53, resulting in a variable flow rate.

The invention has been described in detail sufficient to enable one of ordinary skill in the art to make and use the same. Obviously, modifications and alterations of the preferred embodiments will occur to others upon a reading and understanding of the specification, and it is my intention to include all such alterations and modifications as part of my invention insofar as they come within the scope of the appended claims.

What is claimed is:

1. A flow control valve assembly for use in a system including a source of pressurized fluid, a first priority load circuit having means providing a first load signal, a second priority load circuit including a variable flow control orifice, and an auxiliary load circuit, said flow control valve assembly comprising:

(a) a valve housing means defining first and second valve bores and a priority fluid chamber, each of said first and second valve bores being in fluid communication with said priority fluid chamber;

(b) said valve housing means further defining an inlet fluid port adapted for connection to said source of pressurized fluid, a first priority outlet port for connection to said first priority load circuit, a second priority outlet port for connection to said second priority load circuit, and an auxiliary outlet port for connection to said auxiliary load circuit, said inlet fluid port and said auxiliary outlet port being in open fluid communication with said first valve bore, said first priority outlet port being in open fluid communication with said priority fluid chamber and said second priority outlet port being in open fluid communication with said second valve bore;

(c) a first valve member movably disposed in said first valve bore, means biasing said first valve member toward a position permitting substantially all fluid to flow from said inlet fluid port to said priority fluid chamber, and means communicating a first pressure signal representative of the fluid pressure in said priority fluid chamber to exert a force biasing said first valve member toward a position permitting substantially all fluid to flow from said inlet fluid port to said auxiliary outlet port;

(d) a second valve member movably disposed in said second valve bore, means defining orifice means operable to throttle the fluid pressure of fluid flowing from said priority fluid chamber to said second priority outlet port to provide one of (a) a generally constant pressure differential across said flow control orifice of said second priority load circuit, and (b) a generally constant rate of fluid flow through said orifice means; means biasing said second valve member toward a position to increase said rate of fluid flow, said biasing means including a second load signal representative of the load on the second priority load circuit, and means communicating a second pressure signal to exert a force biasing said second valve member toward a position to decrease said rate of fluid flow, the pressure of said second pressure signal being representative of the fluid pressure upstream of said variable flow control orifice; and (e) said valve housing means defining load signal port means for connection to said first load signal and said second load signal and including shuttle valve means for communicating the higher of said first and second load signals to exert a force biasing said first valve member toward said position permitting substantially all fluid to flow from said inlet fluid port to said priority fluid chamber to provide a flow into said priority fluid chamber sufficient to satisfy the simultaneous demand of the first and second priority load circuits.

2. A flow control valve assembly for use in a system including a source of pressurized fluid, a first priority load circuit having means providing a first load signal, a second priority load circuit, and an auxiliary load circuit, said flow control valve assembly comprising:

(a) valve housing means defining first and second valve bores and a priority fluid chamber, each of said first and second valve bores being in open fluid communication with said priority fluid chamber;

(b) said valve housing means further defining an inlet fluid port adapted for connection to said source of pressurized fluid, a first priority outlet port for connection to said first priority load circuit, a second priority outlet port for connection to said second priority load circuit, and an auxiliary outlet port for connection to said auxiliary load circuit, said inlet fluid port and said auxiliary outlet port being in open fluid communication with said first valve bore, said first priority outlet port being in open fluid communication with said priority fluid chamber and said second priority outlet port being in open fluid communication with said second valve bore;

(c) a first valve member movably disposed in said first valve bore, means biasing said first valve member toward a position permitting substantially all fluid to flow from said inlet fluid port to said priority fluid chamber, and means communicating a first pressure signal representative of the fluid pressure in said priority fluid chamber to exert a force biasing said first valve member toward a position permitting substantially all fluid to flow from said inlet fluid port to said auxiliary outlet port;

(d) a second valve member movably disposed in said second valve bore, means defining orifice means operable to provide a pressure differential between said priority fluid chamber and said second priority outlet port, means biasing said second valve member toward a position in which said pressure differential is a minimum, said biasing means including a second load signal representative of the load on the second priority load circuit, and means communicating a second pressure signal to exert a force biasing said second valve member toward a position in which said pressure differential is a maximum, the pressure of said second pressure signal being representative of the fluid pressure in said priority outlet fluid chamber; and (e) said valve housing means defining load signal port means for connection to said first load signal and said second load signal and including shuttle valve means for communicating the higher of said first and second load signals to exert a force biasing said first valve member toward said position permitting substantially all fluid to flow from said inlet fluid port to said priority fluid chamber to provide a flow into said priority fluid chamber sufficient to satisfy the simultaneous demand of the first and second priority load circuits.

3. A flow control valve assembly for use in a system including a source of pressurized fluid, a vehicle steering circuit having means providing a steering load signal, a vehicle brake circuit, and an auxiliary load circuit, said flow control valve assembly comprising:

(a) valve housing means defining first and second valve bores and a priority fluid chamber, each of said first and second valve bores being in open fluid communication with said priority fluid chamber;

(b) said valve housing means further defining an inlet fluid port adapted for connection to said source of pressurized fluid, a first priority outlet port for connection to said vehicle steering circuit, a second priority outlet port for connection to said brake circuit, and an auxiliary outlet port for connection to said auxiliary load circuit, said inlet fluid port and said auxiliary outlet port being in open fluid communication with said first valve bore, said first priority outlet port being in open fluid communication with said priority fluid chamber and said second priority outlet port being in open fluid communication with said second valve bore;

(c) a first valve member movably disposed in said first valve bore, means biasing said first valve member toward a position permitting substantially all fluid to flow from said inlet fluid port to said priority fluid chamber, and means communicating a first pressure signal representative of the fluid pressure in said priority fluid chamber to exert a force biasing said first valve member toward a position permitting substantially all fluid to flow from said inlet fluid port to said auxiliary outlet port;

(d) a second valve member movably disposed in said second valve bore, said second valve member and said second valve bore cooperating to define orifice means operable to provide a pressure differential between said priority fluid chamber and said second priority outlet port, means biasing said second valve member toward a position in which said pressure differential is a minimum, said biasing means including a brake load signal representative of the load on the brake circuit, and means communicating a second pressure signal to exert a force biasing said second valve member toward a position in which said pressure differential is a maximum, the pressure of said second pressure signal being representative of the fluid pressure in said priority fluid chamber; and (e) said valve housing means defining load signal port means for connection to said steering load signal and said brake load signal and including shuttle valve means for communicating the higher of said steering and brake load signals to exert a force biasing said first valve member toward said position permitting substantially all fluid to flow from said inlet fluid port to said priority fluid chamber to provide a flow into said priority fluid chamber sufficient to satisfy the simultaneous demand of the steering and brake circuits.

4. A vehicle hydraulic system comprising:
(a) a steering load circuit including steering control valve means having means providing a steering load signal;
(b) a brake load circuit including a brake control valve;
(c) an auxiliary load circuit;
(d) priority flow control valve means including an inlet fluid port adapted for connection to a source of pressurized fluid, an outlet, and an auxiliary outlet port for connection to said auxiliary load circuit;
(e) means defining a priority fluid chamber in fluid communication with said outlet, and a first priority outlet port in communication with said priority fluid chamber and connected to said steering load circuit;
(f) said priority flow control valve means including a movable valve member, means biasing said valve member toward a position permitting substantially all fluid to flow from said inlet fluid port to said outlet, and means communicating a first pressure signal representative of the fluid pressure in said priority fluid chamber to exert a force biasing said valve member toward a position permitting substantially all fluid to flow from said inlet port to said auxiliary outlet port;

(g) pressure-compensating valve means having inlet means in open fluid communication with said priority fluid chamber, and a second priority outlet port in fluid communication with said brake load circuit, said pressure-compensating valve means including a movable valve member, means defining orifice means operable to throttle the fluid pressure of fluid flowing from said inlet means to said second priority outlet port, means biasing said movable valve member toward a position tending to increase the rate of fluid flow through said orifice means, said biasing means including a load signal representative of the load on the brake load circuit, and means communicating a second pressure signal to exert a force biasing said valve member toward a position tending to decrease the rate of fluid flow through said orifice means, the pressure of said second pressure signal being representative of the fluid pressure in said priority fluid chamber;

(h) shuttle valve means in fluid communication with said steering load signal and said brake load signal, and being operable to communicate the higher of said load signals to exert a force biasing said movable valve member of said priorty flow control valve means toward said position permitting substantially all fluid to flow from said inlet fluid port to said outlet to provide sufficient flow of fluid into said priority fluid chamber to satisfy the simultaneous demand of said steering load circuit and said brake load circuit.

5. A flow control valve assembly as claimed in claim 1, 2, or 3 wherein said first valve member is operable to throttle fluid pressure flowing to said first priority outlet port when the fluid pressure at said inlet fluid port exceeds the pressure required at said first priority outlet port.

6. A system as claimed in claim 4 wherein said movable valve member of said priority flow control valve means is operable to throttle fluid pressure flowing to said outlet when the fluid pressure at said inlet fluid port exceeds the pressure required at said first priority outlet port.

7. A flow control valve assembly as claimed in claim 1 or 2 wherein said second priority load circuit includes a closed-center, load sensing control valve having variable, flow control orifice means, said second load signal comprising a load signal taken from downstream of said flow control orifice means.

8. A vehicle hydraulic system as claimed in claim 4 wherein said brake control valve is of the closed-center, load sensing type having a variable flow control orifice, said load signal representative of the load on the brake load circuit being taken from downstream of said flow control orifice.

* * * * *